No. 798,113. PATENTED AUG. 29, 1905.
J. PETERSON.
LAWN MOWER.
APPLICATION FILED APR. 29, 1905.
2 SHEETS—SHEET 1.
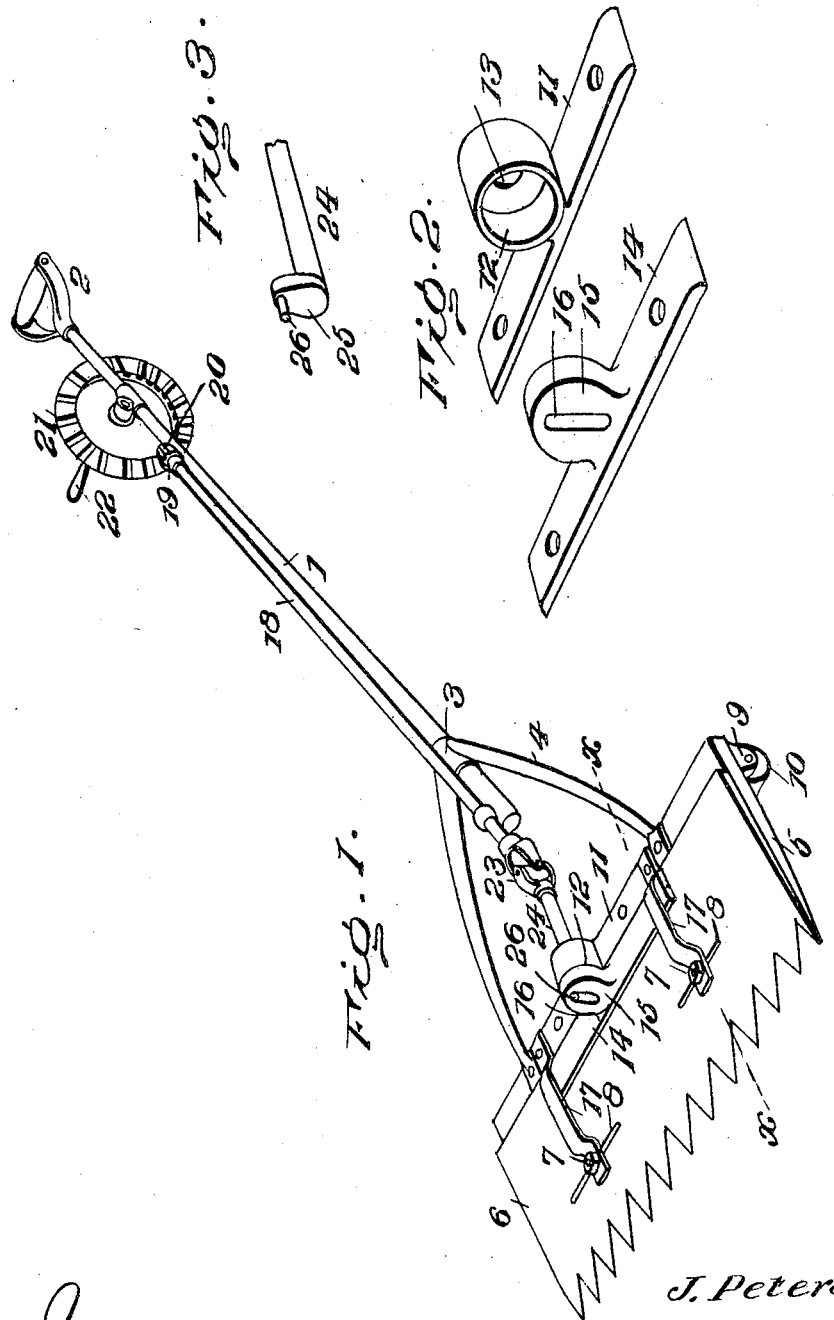
Inventor
J. Peterson
Witnesses
By R. & A. B. Lacey, Attorneys No. 798,113. PATENTED AUG. 29, 1905.
J. PETERSON.
LAWN MOWER.
APPLICATION FILED APR. 29, 1905.
2 SHEETS—SHEET 2.
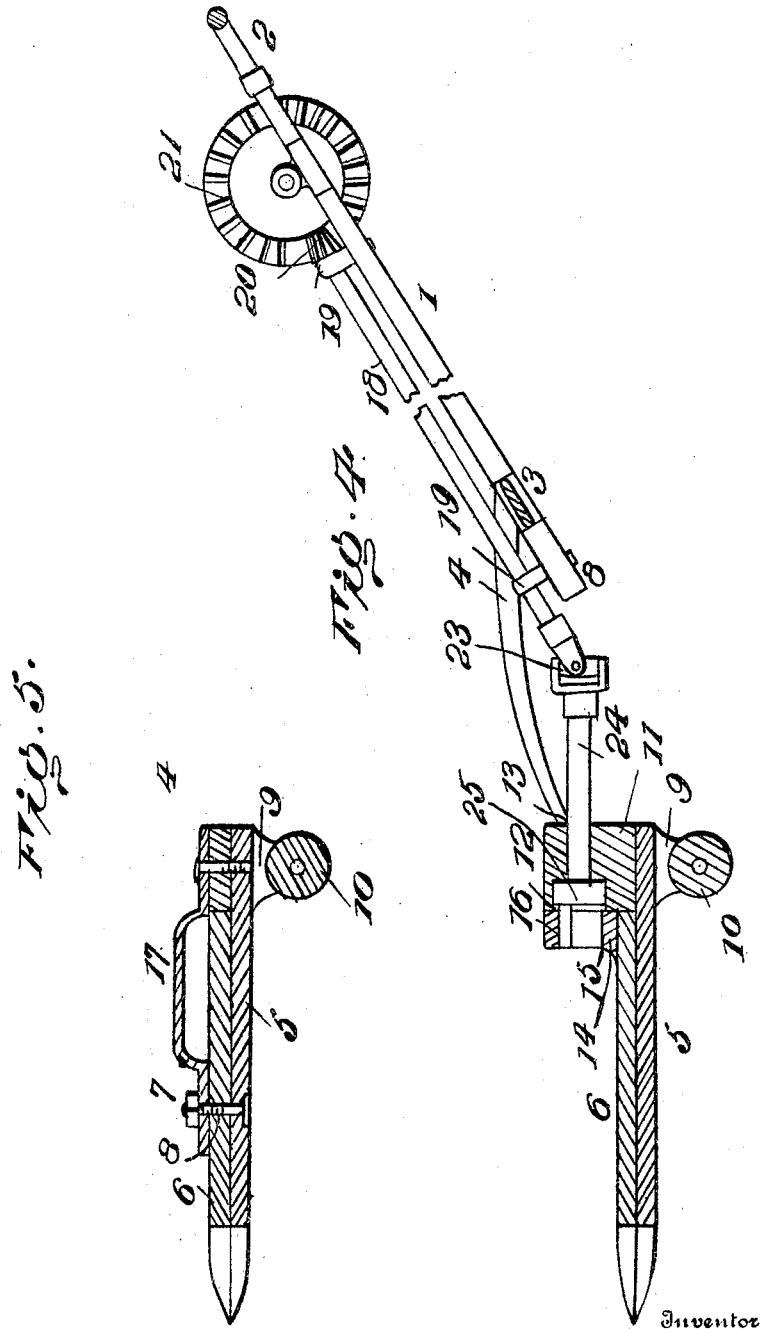
Inventor
J. Peterson

UNITED STATES PATENT OFFICE.

JAMES PETERSON, OF COLORADO SPRINGS, COLORADO.

LAWN-MOWER.

No. 798,113.  Specification of Letters Patent.  Patented Aug. 29, 1905.

Application filed April 29, 1905. Serial No. 258,078.

*To all whom it may concern:*

Be it known that I, JAMES PETERSON, a citizen of the United States, residing at Colorado Springs, in the county of El Paso and State of Colorado, have invented certain new and useful Improvements in Lawn-Mowers, of which the following is a specification.

This invention embodies a simple construction of lawn-mower particularly designed for use in mowing or cutting grass close to fences, around trees, and similar obstructions where the ordinary larger lawn-mower cannot be readily manipulated because of the lack of space.

The invention consists of a hand-operated device embodying, essentially, a pole or handle provided at its lower end with a sickle-plate and operated by suitable gear connections with means upon the handle.

For a full description of the invention and the merits thereof and also to acquire a knowledge of the details of construction of the means for effecting the result reference is to be had to the following description and accompanying drawings, in which—

Figure 1 is a perspective view of a mower embodying the invention. Fig. 2 is a detail perspective view showing the head-plates attached to the toothed and sickle plates carried by the handle and connected with the short crank-shaft. Fig. 3 is a detail broken perspective view of the crank-shaft. Fig. 4 is a vertical longituidnal section of the invention. Fig. 5 is a vertical section about on the line X X of Fig. 1.

Corresponding and like parts are referred to in the following description and indicated in all the views of the drawings by the same reference characters.

Referring to the drawings, the numeral 1 indicates the handle of the mower, which handle may be of any suitable length, so as to be grasped by the operator as the mower is forced along the ground in advancing the same. The handle or pole 1 is provided at its upper end with a suitable grip 2 and at its lower end with a head 3, having bifurcated or spaced members 4 projecting downwardly therefrom and from the handle. Secured to the lower extremities of the members 4 is a toothed plate 5, upon the upper side of which is carried a sickle-plate 6, mounted for reciprocal movement thereon. Both of the plates 5 and 6 are provided with teeth which coöperate in the customary manner in cutting the grass. Pins or studs 7 project upwardly from the toothed plate 5 and pass through transverse slots 8 in the sickle-plate 6, thereby admitting of the reciprocal movement of the latter with reference to the plate 5 aforesaid. Journaled in suitable brackets 9, projected downwardly from one side of the plate 5, is a roller 10, which supports the mower and facilitates pushing the same. The roller 10 is arranged beneath the plate 5. Secured to the upper side of the plate 5, near the rear edge thereof, is a head-plate 11, from which upwardly projects an integral bearing-lug 12, formed with an opening 13. The plate 11 is secured to the plate 5 in any substantial way, and a plate 14 is attached to the sickle-plate 6 adjacent the plate 11, the plate 14 having an upwardly-projecting lug 15, also of a form similar to the lug 12, the last-mentioned lug 15, however, being formed with a slot 16. The sickle-plate 6 is held down against the toothed plate 5 by means of springs 17, the latter being of the flat form, secured at one end to the head-plate 11 and provided at the opposite end with openings to receive the studs or pins 7, projecting upwardly through the sickle-plate 6. The springs 17 normally bear downwardly upon the sickle-plate 6, so as to prevent the displacement of the latter from the toothed plate 5, the spring having sufficient pressure to cause the plates 5 and 6 to operate closely in contact with each other, facilitating the cutting action of these members.

The operating mechanism carried by the handle or pole 1, which is connected with the sickle-plate 6 for actuation of the latter, comprises a shaft 18, mounted in suitable bearings formed by eyebolts 19 or like members attached to the handle 1, the upper end of the shaft 18 having a bevel-pinion 20 thereon, said bevel-pinion being in mesh with the teeth of a crank-wheel 21, journaled to the handle near the grip 2 and convenient for operation by the operator of the mower. A crank-handle 22 projects from the wheel 21 and is adapted to be rotated in order that motion may be imparted to the shaft 18. The shaft 18 is inclined relative to the plane of movement of the sickle-plate 6, and the lower extremity of said shaft 18 is connected by a universal connection 23 to a short crank-shaft 24, by which the sickle-plate 6 is directly actuated. The shaft 24 is connected at one end with the shaft 18, the opposite end of the shaft having a crank 25 and wrist-pin 26 projecting from the crank. The shaft 24 passes through the opening or bearing 13 in the lug 12, and the crank 25 operates between the lug 12 and the lug 15 of the head-plates 11 and 14, respectively. The wrist-pin 26 projects from the crank 25 into the slot 16 of the lug 15, and it will be readily noted that when the wheel 21 is rotated by the operator the shaft 18 will rotate the shaft 24, and the wrist-pin connection between the shaft 24 and the lug 15, which is carried by the plate 14, secured to the sickle-plate, will cause the sickle-plate to reciprocate and secure the necessary cutting action of the sickle-plate relative to the toothed plate 5.

Having thus described the invention, what is claimed as new, and desired to be secured by Letters Patent, is—

1. In a lawn-mower, the combination of a toothed plate, a sickle-plate adapted to reciprocate upon the toothed plate, and springs carried by the toothed plate and bearing against the sickle-plate to hold the latter in position thereon, the sickle-plate being provided with slots, and the toothed plate having pins or studs projecting upwardly therefrom through the slots of the sickle-plate into engagement with the springs aforesaid.

2. In a lawn-mower, the combination of a toothed plate, a sickle-plate provided with slots and mounted upon the toothed plate, pins or studs projecting from the toothed plate and extending through the slots of the sickle-plate, flat springs carried by the toothed plate and provided with openings to receive the studs or pins aforesaid, said springs bearing against the upper side of the sickle-plate, a handle, a head for said handle attached to the toothed plate, an apertured lug projecting from the toothed plate, a slotted lug extending from the sickle-plate adjacent the apertured lug aforesaid, a crank-shaft passing through the apertured lug and provided with a wrist-pin entering a slot of the slotted lug, and an operating-shaft carried by a handle and having universal connection with the crank-shaft.

In testimony whereof I affix my signature in presence of two witnesses.

JAMES PETERSON. [L. S.]

Witnesses:
JOHN W. KLEIN,
ALLEN A. McKINNON.